United States Patent
Bao (10) Patent No.: US 11,262,891 B2
(45) Date of Patent: Mar. 1, 2022

(54) METHOD FOR E-NOTE MANAGEMENT OF ELECTRONIC BOOKS, AND ELECTRONIC DEVICE

(71) Applicant: Zhangyue Technology Co., Ltd, Beijing (CN)

(72) Inventor: Dongxu Bao, Beijing (CN)

(73) Assignee: Zhangyue Technology Co., Ltd, Beijing (CN)

( * ) Notice: Subject to any disclaimer, the term of this patent is extended or adjusted under 35 U.S.C. 154(b) by 0 days.

(21) Appl. No.: 16/631,786

(22) PCT Filed: Mar. 23, 2018

(86) PCT No.: PCT/CN2018/080283
§ 371 (c)(1),
(2) Date: Jan. 16, 2020

(87) PCT Pub. No.: WO2019/015352
PCT Pub. Date: Jan. 24, 2019

(65) Prior Publication Data
US 2020/0210032 A1    Jul. 2, 2020

(30) Foreign Application Priority Data

Jul. 21, 2017 (CN) .......................... 201710600658.X (51) Int. Cl.
*G06F 3/0483* (2013.01)
*G06F 16/13* (2019.01)
(Continued)

(52) U.S. Cl.
CPC ........ *G06F 3/0483* (2013.01); *G06F 3/04817* (2013.01); *G06F 16/13* (2019.01);
(Continued)

(58) Field of Classification Search
CPC ..... G06F 3/0483; G06F 40/169; G06F 40/117
See application file for complete search history.

(56) References Cited

U.S. PATENT DOCUMENTS

2013/0290838 A1* 10/2013 Hoareau .................. G06F 16/38
715/255
2013/0318465 A1* 11/2013 Cheng ................... G06Q 10/101
715/776
(Continued)

FOREIGN PATENT DOCUMENTS

CN       101751476 A      6/2010
CN       101882384 A      11/2010
(Continued)

OTHER PUBLICATIONS

International Patent Application No. PCT/CN2018/080283; Int'l Search Report; dated Jul. 2, 2018; 2 pages.
(Continued)

*Primary Examiner* — Scott T Baderman
*Assistant Examiner* — Seung Woon Jung
(74) *Attorney, Agent, or Firm* — BakerHostetler (57) ABSTRACT

The present disclosure discloses a method for managing e-notes of electronic books and an electronic device. The method includes: acquiring content data of an e-note when the e-note is generated for the electronic book; storing the content data of the e-note into an e-note file corresponding to the electronic book; in response to receiving an e-note management instruction, identifying the electronic book corresponding to the e-note management instruction, acquiring and displaying the e-note file corresponding to the electronic book, and managing the e-note based on the e-note file corresponding to the electronic book.

19 Claims, 3 Drawing Sheets

(51) Int. Cl.
*G06F 16/31* (2019.01)
*G06F 40/109* (2020.01)
*G06F 40/166* (2020.01)
*G06F 3/04817* (2022.01)

(52) U.S. Cl.
CPC ............ *G06F 16/31* (2019.01); *G06F 40/109* (2020.01); *G06F 40/166* (2020.01)

(56) References Cited

U.S. PATENT DOCUMENTS

2016/0117301 A1* 4/2016 Chan ..................... G06F 3/0484
715/753
2018/0197109 A1* 7/2018 Taylor .................... G06N 20/00

FOREIGN PATENT DOCUMENTS

| CN | 102902661 A | 1/2013 |
| CN | 107391475 A | 11/2017 |

OTHER PUBLICATIONS

Maria M. Blaga; "The complete guide to using the Kindle app to read eBooks in Windows 10"; https://www.digitalcitizen.life/how-use-kindle-app-windows-read-ebooks; Digital Citizen; Mar. 2017; accessed Apr. 15, 2020; 7 pags.

"User's Guide PRS-600 Jump to the table of contents"; Digital Book Reader; Sony Corporation; Reader™; © 2009; 190 pages.

* cited by examiner

METHOD FOR E-NOTE MANAGEMENT OF ELECTRONIC BOOKS, AND ELECTRONIC DEVICE

CROSS REFERENCE TO RELATED APPLICATIONS

This application is the U.S. National Stage of International Application No. PCT/CN 2018/080283, filed on Mar. 23, 2018, which claims priority to Chinese Patent Application No. 201710600658.X, filed on Jul. 21, 2017, the entire content of which is incorporated herein by reference.

TECHNICAL FIELD

The present disclosure relates to the field of communications, and in particular, to a method for e-note management of electronic books and electronic device.

BACKGROUND

As the saying goes, "you can't read without writing". Many people are used to taking notes when they are reading. At present, mobile terminal-based electronic book reading software has been able to support electronic note (e-note) functions. For example, when a user reads a certain page of a document in an electronic book, he or she can select, with a box, the specified content in the document on that page and record an e-note next to the selected content. Correspondingly, when the user wants to view an e-note recorded in the past, he or she simply needs to turn to the page where the e-note is located and can view the e-note.

However, because each e-note is only recorded in the corresponding page of the electronic book, the total number of the pages of the electronic book easily reaches tens or even hundreds, and the positions of the e-notes in the electronic book are scattered, the user must flip through the pages in the electronic book one by one so as to be able to complete the query. It can be seen that the marking function provided by the existing electronic book reading software has at least the disadvantage of inconvenient querying.

SUMMARY

In view of the above problem, the present disclosure is proposed in order to provide a method for e-note management of electronic books and an electronic device that overcome the above problem or at least partially solve the above problem.

According to one aspect of the present disclosure a method for e-note management of electronic books is provided, including: acquiring content data of an e-note, when the e-note is generated for the electronic book, wherein the e-note is one of a plurality of e-notes in the electronic book; storing the content data of the e-note into an e-note file corresponding to the electronic book, wherein there are a plurality of e-note files corresponding to a plurality of electronic books each of which comprises at least one e-note, each e-note file comprises content data corresponding to each e-note in a corresponding electronic book; in response to receiving an e-note management instruction, identifying the electronic book corresponding to the e-note management instruction; acquiring and displaying the e-note file corresponding to the electronic book; and managing the e-note based on the e-note file; wherein the electronic book comprises a first interface for editing each of the plurality of e-notes in the electronic book, the operations further comprise editing the e-note in the electronic book based on the first instruction in response to receiving a first instruction via the first interface, and updating the content data of the e-note in the e-note file corresponding to the electronic book based on a first execution result of the first instruction; and wherein the e-note file comprises a second interface for editing content data in the e-note file corresponding to each e-note in a corresponding electronic book, and the operations further comprise editing the content data in the e-note file based on the second instruction in response to receiving a second instruction via the second interface, and updating the e-note in the electronic book corresponding to the e-note file based on a second execution result of the second instruction.

According to another aspect of this disclosure, an electronic device is provided, including: a processor, a memory, a communication interface and a communication bus, wherein the processor, the memory and the communication interface communicate with each other through the communication bus; the memory stores at least one executable instruction, which causes the processor to perform the following operations of: acquiring content data of an e-note when the e-note is generated for the electronic book, wherein the e-note is one of a plurality of e-notes in the electronic book; storing the content data of the e-note into an e-note file corresponding to the electronic book, wherein there are a plurality of e-note files corresponding to a plurality of electronic books each of which comprises at least one e-notes, each e-note file comprises content data corresponding to each e-note in a corresponding electronic book; in response to receiving an e-note management instruction, identifying the electronic book corresponding to the e-note management instruction; acquiring and displaying the e-note file corresponding to the electronic book; and managing the plurality of e-notes in the electronic book based on the e-note file; wherein the electronic book comprises a first interface for editing each of the plurality of e-notes in the electronic book, the operations further comprise editing the e-note in the electronic book based on the first instruction in response to receiving a first instruction via the first interface, and updating the content data of the e-note in the e-note file corresponding to the electronic book based on a first execution result of the first instruction; and wherein the e-note file comprises a second interface for editing content data in the e-note file corresponding to each e-note in a corresponding electronic book, and the operations further comprise editing the content data in the e-note file based on the second instruction in response to receiving a second instruction via the second interface, and updating the e-note in the electronic book corresponding to the e-note file based on a second execution result of the second instruction.

According to yet another aspect of the present disclosure, a non-transitory computer-readable storage medium is provided. The non-transitory computer-readable storage medium stores executable instructions that upon execution causes a computer to execute the following operations: acquiring content data of an e-note when the e-note is generated for the electronic book, wherein the e-note is one of a plurality of e-notes in the electronic book; storing the content data of the e-note into an e-note file corresponding to the electronic book, wherein there are a plurality of e-note files corresponding to a plurality of electronic books each of which comprises at least one e-notes, each e-note file comprises content data corresponding to each e-note in a corresponding electronic book; in response to receiving an e-note management instruction, identifying the electronic book corresponding to the e-note management instruction; acquiring and displaying the e-note file corresponding to the electronic book; and managing the plurality of e-notes in the electronic book based on the e-note file; wherein the electronic book comprises a first interface for editing each of the plurality of e-notes in the electronic book, the operations further comprise editing the e-note in the electronic book based on the first instruction in response to receiving a first instruction via the first interface, and updating the content data of the e-note in the e-note file corresponding to the electronic book based on a first execution result of the first instruction; and wherein the e-note file comprises a second interface for editing content data in the e-note file corresponding to each e-note in a corresponding electronic book, and the operations further comprise editing the content data in the e-note file based on the second instruction in response to receiving a second instruction via the second interface, and updating the e-note in the electronic book corresponding to the e-note file based on a second execution result of the second instruction.

According to still another aspect of the present disclosure, a computer program product is further provided, which includes a computing program stored on the above mentioned non-volatile computer-readable storage medium.

In the method for e-note management of electronic books and the electronic device provided by the present disclosure, when e-note is generated by a user for the electronic book, the content data of this e-note can be stored into a e-note file corresponding to this electronic book; correspondingly, when a e-note management instruction is received, acquiring and displaying the e-note file corresponding to this electronic book, in order for the user to perform management of the e-note according to this e-note file. It can thus be seen that, in the manner provided by the present disclosure, the e-note generated by the user is not only recorded in the electronic book, but also further recorded in the e-note file corresponding to the electronic book. Since the e-note file is exclusively used to store the e-note included in the electronic book everywhere, the user does not need to flip through the pages in the electronic book one by one, thus enabling convenient and fast query functions.

The above description is only an overview of the technical solutions of the present disclosure. In order to enable clearer understanding of the technical means of the present disclosure, so as to be able to be implemented in accordance with the contents of the description, and in order to make the above and other objects, features and advantages of the present disclosure more comprehensible, specific embodiments of the present disclosure are enumerated below.

BRIEF DESCRIPTION OF THE DRAWINGS

Various other advantages and benefits will become apparent to those ordinary skilled in the art upon reading the following detailed description of the embodiments below. The drawings are only for the purpose of illustrating the embodiments, and are not to be considered as limiting the present disclosure. Moreover, the same components are denoted with the same reference numerals throughout the drawings. In the drawings.

DETAILED DESCRIPTION

Exemplary embodiments of the present disclosure will be described in more detail below with reference to the drawings. Although the exemplary embodiments of the present disclosure are shown in the drawings, it should be understood that the present disclosure can be implemented in various forms and should not be limited by the embodiments set forth herein. On the contrary, these embodiments are provided in order to enable a thorough understanding of the present disclosure, and to enable a full conveyance of the scope of the present disclosure to those skilled in the art.

First Embodiment

Figure 1:
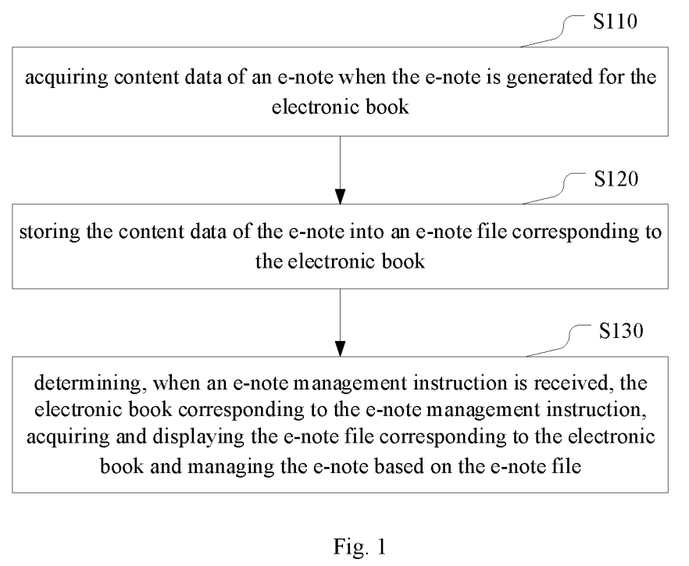
FIG. 1 shows a flowchart of the method for e-note management of electronic books provided by a first embodiment of the present disclosure.

FIG. 1 shows a flowchart of the method for e-note management of electronic books provided by a first embodiment of the present disclosure. As shown in FIG. 1, the method includes the following steps.

A step S110: when the e-note is generated for the electronic book, content data of the e-note are acquired.

Wherein the e-note generally refers to all kinds of information that can play a role of annotation. For example, it can be marks for an original text in the electronic book, or it can be custom contents edited according to the original text in the electronic book.

Wherein the marks can include: marks of one or a plurality of mark level. For example, two mark levels can be divided, in which the important contents in the electronic book are marked as the mark of the first mark level (which is for example displayed in a highlighted form); and the less important contents in the electronic book are marked as the mark of the second mark level (which is for example displayed in a underlined form). Correspondingly, content data of the marks can include at least one item of the following: all contents in the marked original text, contents of the head part in the marked original text, contents of the middle part in the marked original text, contents of the tail part in the marked original text. Specifically, in which form to present the content data of the marks, can be determined through a preset user configuration link. For example, the user configuration link contains a plurality of options, which respectively correspond to implementations for acquiring all contents in the marked original text, contents of the head part, the middle part and the tail part in the marked original text, and so on, and which can be set flexibly by the user according to his or her own needs. Or an appropriate presentation form can also be automatically selected by the system according to the length of the marked original text.

The custom contents can be divided, from the perspective of presentation forms, into a plurality of forms such as custom contents of a text type, custom contents of a picture type; and can be divided, from the perspective of content categories, into custom contents of an annotation type, custom contents of a feeling type. Correspondingly, when acquiring the content data of the custom contents, in order to be convenient for viewing the context of this custom contents in the original text, the contents of the original text corresponding to this custom contents can also be further acquired. Wherein the length of the contents of the original text corresponding to this custom contents can be determined though the extent of the original text selected by the user with the box; or can also be set through the above described user configuration link.

A step S120: the content data of the acquired e-note is stored into a e-note file corresponding to the electronic book.

Specifically, in the present embodiment, for each electronic book, on which marking is performed, a e-note file corresponding to the electronic book is generated. This e-note file can adopt a plurality of forms, such as can be used as an annex of the electronic book, or can also be used as a book of feeling type (or referred to as a user-marked book) which is stored in association with the electronic book. The specific implementation form of the e-note file will not be limited in the present disclosure. Whenever it is detected that a user generates e-note for an electronic book, then the content data of the e-note are synchronously stored into the e-note file corresponding to the electronic book.

When generating the above described e-note file corresponding to the electronic book, one corresponding e-note file can respectively be generated for each electronic book in advance, or the e-note file corresponding to the electronic book can also be generated when it is detected that the user generates a first item of e-note for a certain kind of electronic book.

A step S130: when an e-note management instruction is received, the electronic book corresponding to the e-note management instruction is determined, the e-note file corresponding to the electronic book is acquired and displayed, in order to provide a management function of the e-note according to the e-note file.

Wherein the e-note management instruction generally refers to all kind of instructions, which can be used for managing the e-note of the electronic book, which for example not only can be a first type of instruction of jumping type for jumping from the electronic book to the corresponding e-note file, but also can be a second type of instruction of jumping type for jumping from the e-note file to the corresponding electronic book. Through the above described instruction of jumping type, each e-note in the e-note file can be quickly queried. As another example, the e-note management instruction can also be a management instruction of editing type, such as modifying, adding, deleting, issued for respective items of e-note in at least one of the following: the electronic book, and the e-note file. In short, as long as it is an instruction that enables management of the e-note, it can be applied to the present disclosure, which is not limited in the present disclosure. Therefore, in the present embodiment, through the e-note management instruction, respective items of e-note in at least one of the following can be managed and queried: the electronic book, and the e-note file.

It can thus be seen that, in the manner provided by the present disclosure, the e-note generated by the user is not only recorded in the electronic book, but also further recorded in the e-note file corresponding to the electronic book. Since the e-note file is exclusively used to store the e-note included in the electronic book everywhere, the user does not need to flip through the pages in the electronic book one by one, thus enabling convenient and fast query functions.

Second Embodiment

Figure 2:
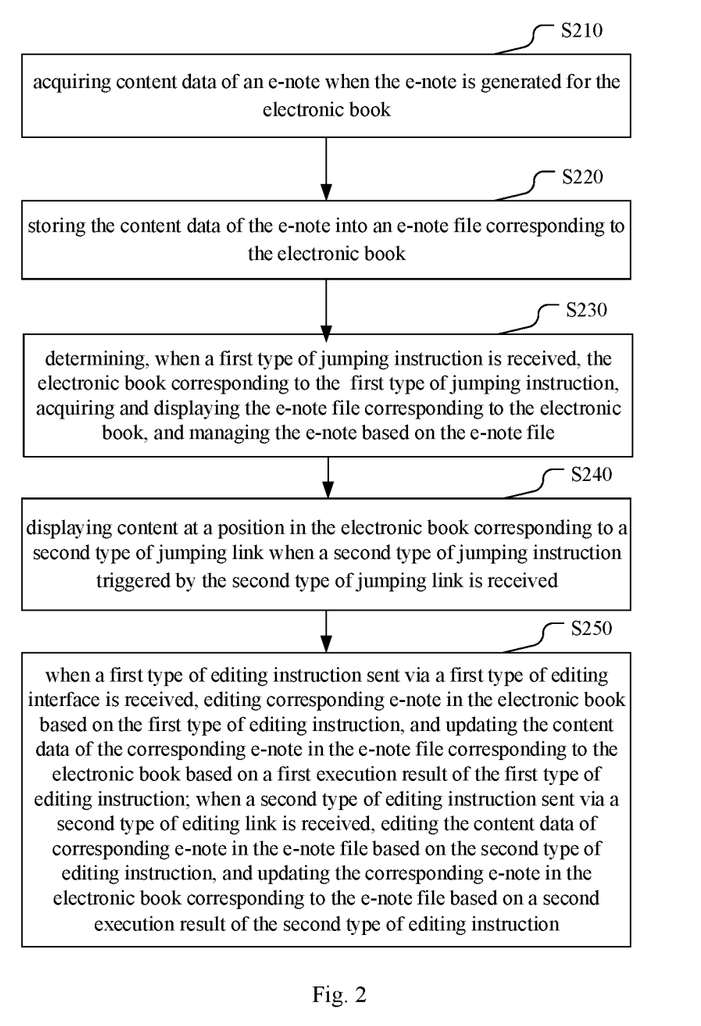
FIG. 2 shows a flowchart of the method for e-note management of electronic books provided by a second embodiment of the present disclosure.

FIG. 2 shows a flowchart of the method for e-note management of electronic books provided by a second embodiment of the present disclosure. As shown in FIG. 2, the method includes the following steps.

A step S210: when the e-note is generated for the electronic book, content data of the e-note are acquired.

Wherein the e-note generally refers to all kinds of information that can play a role of annotation. For example, it can be marks for an original text in the electronic book, or it can be custom contents edited according to the original text in the electronic book. In the present embodiment, the e-note includes two types: marks and custom contents. Correspondingly, whenever it is detected that the user generates one item of e-note for the electronic book, the type of this item of e-note will be determined, and how to acquire the content data of the e-note will be determined according to acquiring rules corresponding to the type of this e-note. Wherein the e-note can further contain a type identification, so as to quickly determine the type of each item of e-note according to the type identification. The specific connotations of various e-note and methods for acquiring various e-note will be introduced in detail below.

Wherein the marks further includes: the mark of a first level, which is denoted in a highlighted form and used for marking the important contents; and the mark of a second level, which is denoted in a underlined form and used for marking the less important contents. Correspondingly, the acquiring rules corresponding to the marks are: acquiring the marked original text in the electronic book; wherein the contents of the original text comprise at least item of the following: all contents in the marked original text, contents of the head part in the marked original text, contents of the middle part in the marked original text, contents of the tail part in the marked original text. Specifically, which form of the contents of the original text will be acquired can be determined through a preset user configuration link. For example, the user configuration link contains a plurality of options, which respectively correspond to implementations for acquiring all contents in the marked original text, contents of the head part, the middle part and the tail part in the marked original text, and so on, and which can be set flexibly by the user according to his or her own needs. Or an appropriate acquiring form can also be automatically selected by the system according to the length of the marked original text.

The custom contents can be divided, from the perspective of presentation forms, into a plurality of forms such as custom contents of a text type, custom contents of a picture type; and can be divided, from the perspective of content categories, into custom contents of a annotation type, custom contents of a feeling type. In this embodiment, the custom contents mainly refers to the custom contents of the annotation type. Correspondingly, when acquiring the content data of the custom contents, in order to be convenient for viewing the corresponding context of this custom contents in the original text, the content data of the mark of the custom contents type can be acquired through the following acquiring rules: acquiring the content data of the custom contents, and further acquiring the contents of the original text corresponding to this custom contents. Wherein the length of the contents of the original text corresponding to this custom contents can be determined though the extent of the original text selected by the user with the box (for example, the user can select a part of the original text through a box similar to a form of a common box); or can also be set through the above described user configuration link. For example, the length of the contents of the original text corresponding to each item of custom contents can be configured through the user configuration link in advance. The length can be denoted through at least one of the following: the number of the words, the number of the sentences, and the number of the paragraphs.

A step S220: the content data of the acquired e-note are stored into a e-note file corresponding to the electronic book.

Specifically, in the present embodiment, when it is detected for the first time that the user generates e-note for the electronic book, a e-note file corresponding to the electronic book is generated, so as to store the e-note. If it is subsequently further detected that the user has generated e-note for the electronic book, the subsequently generated respective items of e-note are stored into the e-note file corresponding to the electronic book in a preset order.

In specific implementation, the e-note file can be presented by adopting a plurality of forms. For example, as an annex of the electronic book, so that the e-note file can be queried under a storage path corresponding to the electronic book. As another example, the e-note file can also be presented in a position of a e-bookshelf, as a separate book stored in association with the electronic book, together with the electronic book corresponding thereto, for users to read. For example, the electronic book and the e-note file corresponding thereto can be arranged in a horizontally adjacent or a vertically adjacent way, and so on. Anyway, the specific presentation form of the e-note file will not be limited in the present disclosure.

In addition, because the user usually will provide a plurality of marks for the same electronic book, correspondingly, whenever the content data of the acquired e-note are stored into the e-note file corresponding to the electronic book, it needs to determine, in accordance with preset sorting rules, a storage position of the content data of the e-note acquired this time, in the e-note file corresponding to the electronic book. Wherein the preset sorting rules include at least one rule of the following: a rule for sorting according to the type of the e-note, a rule for sorting according to generation time of the e-note, and a rule for sorting according to the order of chapters of the e-note in the electronic book. Those skilled in the art may select at least one of the above three types of rules as required.

In the present embodiment, the preset sorting rules include the above three rules at the same time. Correspondingly, different weights can be respectively provided for each type of rules, and the storage position of the content data of the acquired e-note in the e-note file corresponding to the electronic book is determined according to the magnitude of the weights of each rule. For example, it can be set that the weight for the rule of the type of the e-note is larger than the weight for the rule of the generation time, and the weight for the rule of the generation time is larger than the weight for the rule of the order of chapters. Correspondingly, when sorting for the e-note, sorting in accordance with the type of the e-note is preferential. Only under the premise that the type is the same, sorting will be performed in accordance with the generation time. Similarly, only when the generation time is also the same, sorting will be performed in accordance with the order of chapters.

In addition, in the present embodiment, when the preset sorting rules include rules of a plurality of kinds, corresponding storage areas can also be respectively allocated for the e-note of each type, and in the storage area corresponding to the e-note of the type, a plurality of items of e-note of the type are sorted in accordance with at least one dimension of the following: generation time of the e-note, and the order of chapters of the e-note in the electronic book. For example, the e-note file can be divided into a plurality of parts in accordance with the type of the e-note. It is assumed that, in the present embodiment, the e-note mainly includes a type of mark of be important, a type of mark of be less important and a type of note. Correspondingly, the first several pages in the corresponding e-note file are set as an area for storing the e-note of the type of mark of be important, the last several pages in the corresponding e-note file are set as an area for storing the e-note of the type of note, and the remaining pages in the corresponding e-note file are set as an area for storing the e-note of the type of mark of be less important. And in each area, sorting can also be further performed in accordance with a plurality of kinds of rules, and weights can also be provided respectively for various rules.

It can thus be seen that, through the above described sorting rules, the orderly arrangement of the e-note stored into the e-note file corresponding to the electronic book each time can be ensured, so as to achieve the effect of being convenient for query. In an implementation, because respective items of e-note in the e-note file may be accessed by the user from time to time, and at this time, the user may wish to prioritize the order for arranging the important e-note or the e-note with high access frequency, so as to improve the query speed. To this end, in the present embodiment, the method may also further includes the following operations: adjusting the arrangement order of the content data of each piece of e-note stored in the e-note file corresponding to the electronic book according to preset dynamic adjustment rules; wherein the dynamic adjustment rules include at least one of the following: adjusting the arrangement order according to an access frequency of each content data, and adjusting the arrangement order according to the access priority set by the use for content data. The execution timing and execution frequency of the above operations can be flexibly set by those skilled in the art. For example, the access situation of each item of e-note can be recorded in real time, and then the arrangement order can be adjusted every preset time period, according to the access frequency of each recorded information content, so as to prioritize the arrangement order of the e-note with high access frequency. As another example, an access priority setting link can be provided for the user. The access priority setting link can be provided for the entire e-note file, or can also be provided respectively for each item of e-note in the e-note file. When the user accesses a certain item of e-note, if it is determined that the e-note is more important, then the e-note can be provided with a higher priority according to the access priority setting link. Correspondingly, the system will adjust the arrangement order of the e-note according to the received the access priority setting result.

A step S230: when a first type of jumping instruction is received, the electronic book corresponding to the first type of jumping instruction is determined, the e-note file corresponding to the electronic book is acquired and displayed, in order to provide a management function of the e-note according to the e-note file.

Wherein the first type of jumping instruction belongs to one kind of e-note management instructions, which is triggered through a first type of jumping link provided for the electronic book, and used for jumping to the e-note file corresponding to the electronic book. Specifically, in the present embodiment, the first type of jumping link includes a plurality of forms. Correspondingly, the first type of jumping instruction also further includes a plurality of forms, respectively used for jumping to the corresponding position of the e-note file. The first type of jumping link of various forms and the first type of jumping instruction corresponding thereto will be respectively introduced below:

The first type of jumping link of a first form includes at least one of the following forms: when the e-note file is presented as an annex of the electronic book, the first type of jumping link can be a first type of book jumping link of a long-press or double click type provided for a cover icon of the electronic book, which is used for jumping to the e-note file corresponding to the electronic book when the user long-presses or double-clicked the cover icon of the electronic book on the e-bookshelf. When the e-note file is presented in a position of the bookshelf, as a separate book stored in association with the electronic book, together with the electronic book corresponding thereto, the first type of jumping link can be a first type of book jumping link provided for a cover icon of the e-note file corresponding to the electronic book displayed in a e-bookshelf. Specifically, in the above described first type of book jumping link, identification for the electronic book is included, for jumping to the e-note file corresponding to the electronic book. In specific implementation, the position of the first page in the e-note file corresponding to the electronic book can be jumped to through the first type of book jumping link. Therefore, the first type of book jumping link is suitable for being used when querying the entire e-note file. Correspondingly, the instruction triggered by the first type of book jumping link is a whole book first type of jumping instruction.

The first type of jumping link of a second form includes first type of page jumping link provided for each page in the electronic book. Correspondingly, the instruction triggered by the first type of page jumping link is a first type of page jumping instruction. Wherein in the first type of page jumping link, page identification of a corresponding page is included, for jumping to a position of page information corresponding to the page identification, in the e-note file corresponding to the electronic book. Specifically, the first type of page jumping link is provided at least one of the following positions of the corresponding page: a header, a footer, and a page control interface. That is to say, the first type of page jumping link can be respectively provided in each page of the electronic book, in order to jump to the e-note file corresponding to the page when the user is reading the page. For example, if the user is reading the contents in the 30-th page of the electronic book, and the respective items of e-note in the contents of this page are recorded in the fifth page of the e-note file, correspondingly, the fifth page of the e-note file will be jumped to, after the user issues a first type of page jumping instruction through the first type of page jumping link provided at this page.

The first type of jumping link of a third form includes a first type of e-note jumping link provided for each item of e-note in the electronic book. Correspondingly, the instruction triggered by the first type of e-note jumping link is a first type of marking jumping instruction. Wherein in the first type of e-note jumping link, an e-note identification of corresponding e-note is included, for jumping to a position of content data of the e-note corresponding to the an e-note identification, in the e-note file corresponding to the electronic book. That is to say, each item of e-note in the electronic book has a unique e-note identification, which may for example be an e-note ID and is used for quickly and uniquely positioning the e-note. And at a position adjacent to the each item of e-note, the first type of e-note jumping link corresponding to the e-note is further provided, for jumping to the position in the e-note file where the e-note is contained. For example, if the user triggered the first type of e-note jumping instruction through a first type of e-note jumping link with a marking ID of 50, then the content data of the e-note with the e-note ID of 50 in the e-note file will correspondingly be jumped to. In specific implementation, in order to improve the speed and accuracy of jumps, mapping relations between each item of e-note in the electronic book, and the content data of each item of e-note in the e-note file corresponding to the electronic book can further be stored into a preset mapping table; the mapping table is used to realize mutual query of the electronic book and each item of e-note in the e-note file corresponding to the electronic book. For example, for the above described e-note with the e-note ID of 50, the following information will be stored in the mapping table:

Line 5 of page 131 in the electronic book—the e-note ID of 50—line 4 of page 11 in the e-note file Correspondingly, correspondence between the electronic book and the e-note file is established through the e-note IDs, so that the corresponding position in the e-note file can be quickly jumped to though querying the mapping table.

Moreover, the jumping between the electronic book and the e-note file can also be realized through various other ways, in addition to the mapping table.

Specifically, the above described jumping links of first type of various forms can be realized through a plurality of forms, for example, not only can be a jumping link of icon button style, but also can be a jumping link of hyperlink style, or jumping can also be realized directly through a form of clicking or long-pressing the e-note. Correspondingly, the designated position of the corresponding e-note file can be directly jumped to through a hyperlink way, or the jumping purpose can also be achieved through various ways such as the "src" attribute or the <a tag>.

A steps S240: contents of the position corresponding to the second type of jumping link in the electronic book corresponding to the e-note file are displayed, when a second type of jumping instruction triggered through a second type of preset jumping link of is received.

Wherein the second type of jumping instruction also belongs to one kind of the e-note management instructions. Through the present step, the corresponding position in the electronic book can be jumped to from a certain position in the e-note file. In specific implementation, it needs to provide a second type of jumping link for the e-note file in advance. The second type of jumping link specific specifically includes: a second type of e-note jumping link provided for content data of each item of e-note stored in the e-note file; wherein in the second type of e-note jumping link, an e-note identification of corresponding e-note is included; wherein the e-note identification of the e-note is used for determining a position corresponding to the second type of jumping link in the electronic book corresponding to the e-note file. That is to say, in the e-note file, a corresponding second type of e-note jumping link is provided respectively for the content data of each item of e-note, for jumping to the position corresponding to the e-note in the electronic book. For example, if the user triggered a second type of e-note jumping instruction through a second type of e-note jumping link with an e-note ID of 50 which is included in the e-note file, then the e-note with the e-note ID of 50 in the electronic book will be correspondingly jumped to. In specific implementation, the second type of jumping instruction can also be realized through a way of querying the above described mapping table, and the form of the second type of jumping link can also be set with reference to the first type of jumping link, and will not be repeated here.

Specifically, displaying contents of the position corresponding to the second type of jumping link in the electronic book corresponding to the e-note file can be implemented through at least one of the following two ways:

In a first displaying way, a position corresponding to the second type of jumping link in the electronic book corresponding to the e-note file will be directly jumped to, and contents at the position of the electronic book will be displayed. That is to say, in the first displaying way, when the user is reading the e-note file, if the user clicks the second type of jumping link, then the screen is made to jump to the corresponding position in the corresponding electronic book, that is: the electronic book will be directly opened on the front end of the terminal device, and the corresponding contents in the electronic book will be displayed. If the user clicks the back button or a button for closing the electronic book, then the electronic book can be closed and the current page in the e-note file can be jumped back to. Because in the first displaying way, the electronic book will be directly opened, the relevant operations, such as an operation of turning a page, marking, which are further performed in the electronic book by the user, will be facilitated.

In a second displaying way, contents of the position corresponding to the second type of jumping link in the electronic book corresponding to the e-note file, will be acquired, and the acquired contents will be displayed in at least one of the following ways: a draggable floating box, and a draggable prompt box; wherein in the floating box and the prompt box, a control button is further provided, for controlling the contents to be displayed. That is to say, in the second displaying way, when the user is reading the e-note file, if the user clicks the second type of jumping link, then the draggable floating box/prompt box is directly popped up on the currently displayed page of the e-note file, and the contents of the corresponding part in the corresponding electronic book are displayed through the floating box/the prompt box. That is: the electronic book will be opened in the background of the terminal device, and the corresponding contents in the electronic book will be acquired, and the acquired contents will displayed into the floating box/the prompt box. In addition, in order to facilitate the user to understand the context of the contents of the original text, a control button is further provided in the floating box and the prompt box, for controlling the contents to be displayed. For example, the control button can be a button of the forward or backward type, which is used to implement a page forward or page backward instruction. It can thus be seen that, in the second displaying way, there is no need to open the electronic book in the front end of the terminal device, and the displayed page of the terminal device does not need to jump, either. Correspondingly, the user only needs to close the floating box/the prompt box after finishing browsing. In addition, the specific positions of the floating box and the prompt box can be flexibly dragged by the user, and it is preferable that the relevant information in the e-note file is not blocked. Therefore, the second displaying way enables the user to browse the related contents in the electronic book and the e-note file at the same time, which facilitates implementation of comparison reading and improves user experience.

A steps S250: when a first type of editing instruction sent through a first type of preset editing link is received, corresponding e-note in the electronic book according to the e first type of preset editing link is edited, and the content data of the corresponding e-note in the e-note file corresponding to the electronic book are updated, according to execution result of the editing instruction; when a second type of editing instruction sent through a second type of editing link is received, the content data of corresponding e-note in the e-note file according to the second type of editing instruction are edited, and the corresponding e-note in the electronic book corresponding to the e-note file is updated, according to execution result of the second type of editing instruction.

The present step is mainly used to implement synchronous update between the electronic book and the e-note file. Specifically, in the electronic book, a first type of editing instruction is further provided, for editing each item of e-note in the electronic book. For example, respectively for each item of e-note in the electronic book, one first type of editing link for editing the item of e-note can be provided, or for each page in the electronic book, one first type of editing link for editing each item of e-note in the page can also be provided. Correspondingly, when a first type of editing instruction sent through the first type of editing link is received, corresponding e-note in the electronic book will be edited according to the first type of editing instruction, and the content data of the corresponding e-note in the e-note file corresponding to the electronic book will be updated according to execution result of the editing instruction. For example, assume that the first type of editing instruction issued by the user through the first type of editing link provided for the e-note with the e-note ID of 50 in the electronic book is: deleting some words contained in the e-note with the e-note ID of 50. Correspondingly, in the e-note file corresponding to the electronic book, corresponding words contained in the content data of the e-note with the e-note ID of 50 will be deleted, so as to achieve consistency of the e-note recorded in the e-note file and the electronic book. In addition to an editing instruction of deletion type, the first type of editing instruction can also be an editing instruction of various types, such as adding type and replacing type.

In addition, in the e-note file, a second type of editing link is further provided, for editing content data of each item of e-note in the e-note file. For example, respectively for the content data of each item of e-note in the e-note file, one second type of editing link for editing the e-note of the item of e-note can be provided. Correspondingly, when a second type of editing instruction sent through the second type of editing link is received, the content data of corresponding e-note in the e-note file will be edited according to the second type of editing instruction, and the corresponding e-note in the corresponding electronic book will be updated according to execution result of the editing instruction. For example, assume that the second type of editing instruction sent by the user through the second type of editing link provided for the e-note with the e-note ID of 50 in the e-note file is: deleting a part of words contained in the content data of the e-note with the e-note ID of 50. Correspondingly, in the corresponding electronic book, corresponding words contained in the e-note with the e-note ID of 50 will be deleted, so as to achieve consistency of the e-note recorded in the e-note file and the electronic book.

It can thus be seen that, through the present step, whether the user performs an editing operation on a part of the e-note in the electronic book during browsing of the electronic book, or the user performs an editing operation on a part of the e-note in the e-note file during browsing of the e-note file, the operation results corresponding to the corresponding editing operation will be synchronized to the other file, thereby achieving the synchronous update of the electronic book and the e-note file, which not only provides convenience for the user, but also ensures the accuracy of the electronic book and the e-note file.

In specific implementation, the synchronous update of the electronic book and the e-note file can be achieved in various ways. For example, the electronic book and the e-note file can be associated through a pointer, thereby realizing the synchronous update of the two. As another example, the mapping relationship between the corresponding contents in the two can also be determined through the above described mapping table, so as to achieve synchronous update of the two. As yet another example, a synchronization operation may also be implemented through a preset synchronization link or synchronization link, and the specific synchronization manner will not be limited in the present disclosure.

In addition, the execution sequence of steps S230 to S250 described above can be flexibly adjusted according to the user's operation sequence, which is not limited in the present embodiment. In addition, the user may also select only at least one of steps S230 to S250 for execution as required, and therefore, each step in steps S230 to S250 is optional.

In summary, it can be known that, through the above described ways, not only the e-note in the electronic book can be separately organized into a book, so as to facilitate the querying of the user, but also the flexible jump between the electronic book and the e-note file can be realized, so as to facilitate the cross-reading of the user between the two. Moreover, the present disclosure also provides an automatic synchronization function between the electronic book and its corresponding e-note file, ensuring consistency between the two.

Third Embodiment

The third embodiment of the present disclosure provides a non-volatile computer-readable storage medium, in which at least one executable instruction is stored, wherein the computer-executable instruction can execute an application control method in any of the above method embodiments. The executable instruction can be specifically used for causing the processor to perform the following operations of: acquiring content data of an e-note, when the e-note is generated for the electronic book; storing the content data of the e-note into an e-note file corresponding to the electronic book; determining, when an e-note management instruction is received, the electronic book corresponding to the e-note management instruction, acquiring and displaying the e-note file corresponding to the electronic book, in order to provide a management function of the e-note according to the e-note file.

In an optional embodiment, the executable instruction further causes the processor to perform the following operations of: providing a first type of jumping link for the electronic book; the e-note management instruction include: a first type of jumping instruction triggered by the first type of jumping link; wherein the first type of jumping link include at least one of the following: a first type of book jumping link of a long-press or double click type provided for a cover icon of the electronic book; a first type of book jumping link provided for a cover icon of the e-note file corresponding to the electronic book displayed in a e-bookshelf; wherein in the first type of book jumping link, an identification for the electronic book is included, for jumping to the e-note file corresponding to the electronic book; a first type of page jumping link provided for each page in the electronic book; wherein in the first type of page jumping link, a page identification of a corresponding page is included, for jumping to a position of file page corresponding to the page identification, in the e-note file corresponding to the electronic book; wherein the first type of page jumping link is provided at least one of the following positions of the corresponding page in the electronic book: a header, a footer, and a page control interface; a first type of e-note jumping link provided for each e-note in the electronic book; wherein in the first type of e-note jumping link, an e-note identification of a corresponding e-note is included, for jumping to a position of content data of the e-note corresponding to the e-note identification in the e-note file corresponding to the electronic book.

In an optional embodiment, the executable instruction further causes the processor to perform the following operations of: providing a second type of jumping link for the e-note file; and displaying contents of the position corresponding to the second type of jumping link in the electronic book corresponding to the e-note file, when a second type of jumping instruction triggered by the second type of jumping link is received.

In an optional embodiment, the second type of jumping link comprises a second type of e-note jumping link provided for content data of each e-note stored in the e-note file; wherein in the second type of e-note jumping link, a e-note identification of a corresponding e-note is included; wherein the e-note identification of the e-note is used for determining a position corresponding to the second type of jumping link in the electronic book corresponding to the e-note file.

In an optional embodiment, the executable instruction further causes the processor to perform the following operations of: jumping to a position corresponding to the second type of jumping link in the electronic book corresponding to the e-note file and displaying contents at the position of the electronic book; acquiring contents of the position corresponding to the second type of jumping link in the electronic book corresponding to the e-note file, and displaying the acquired contents.

In an optional embodiment, in the electronic book, a first type of editing link is further provided, for editing each item of e-note in the electronic book, and then the executable instruction further causes the processor to perform the following operations of: when a first type of editing instruction sent through the first type of editing link is received, editing corresponding e-note in the electronic book according to the first type of editing instruction, and updating the content data of the corresponding e-note in the e-note file corresponding to the electronic book, according to execution result of the first type of editing instruction; in the e-note file, a second type of editing link is further provided, for editing content data of each item of e-note in the e-note file, and then the executable instruction further causes the processor to perform the following operations of: when a second type of editing instruction sent through the second type of editing link is received, editing the content data of corresponding e-note in the e-note file according to the second type of editing instruction, and updating the corresponding e-note in the electronic book corresponding to the e-note file, according to execution result of the second type of editing instruction.

In an optional embodiment, types of the e-note comprise at least one of the following: marks for an original text in the electronic book, and custom contents edited according to the original text in the electronic book; wherein the marks further comprises: marks of one or a plurality of mark level; the custom contents further comprises at least one of the following: custom contents of a text type, custom contents of a picture type, custom contents of an annotation type, and custom contents of a feeling type.

In an optional embodiment, the executable instruction further causes the processor to perform the following operations of: determining the type of the e-note, and acquiring the content data of the e-note according to an acquiring rule corresponding to the type.

In an optional embodiment, when the type of the e-note is the marked type, the acquiring rule corresponding to the type is: acquiring the marked original text in the electronic book; wherein the contents of the original text comprise at least one item of the following: all contents in the marked original text, contents of the head part in the marked original text, contents of the middle part in the marked original text, and contents of the tail part in the marked original text; when the type of the e-note is the custom contents type, the acquiring rule corresponding to the type is: acquiring the custom contents and acquiring the original text corresponding to the custom contents in the electronic book.

In an optional embodiment, the executable instruction further causes the processor to perform the following operations of: determining a storage position of the content data of the acquired e-note in the e-note file corresponding to the electronic book, in accordance with preset sorting rules; wherein the preset sorting rules include at least one rule of the following: a rule for sorting according to the type of the e-note, a rule for sorting according to generation time of the e-note, a rule for sorting according to the order of chapters of the e-note in the electronic book.

In an optional embodiment, when there are multiple preset sorting rules, different weights are respectively provided for each type of rules, and the storage position of the content data of the acquired e-note in the e-note file corresponding to the electronic book is determined according to the magnitude of the weights of each rule; or when there are multiple preset sorting rules, corresponding storage areas are respectively allocated for the e-note of each type, and in the storage area corresponding to the e-note of the type, a plurality of items of e-note of the type are sorted in accordance with at least one rule of the following: generation time of the e-note, and the order of chapters of the e-note in the electronic book.

In an optional embodiment, the executable instruction further causes the processor to perform the following operations of: adjusting the arrangement order of the content data of each piece of e-note stored in the e-note file according to preset dynamic adjustment rules; wherein the dynamic adjustment rules include at least one of the following: adjusting the arrangement order according to an access frequency of each content data, and adjusting the arrangement order according to a preset access priority for the content data.

In an optional embodiment, the executable instruction further causes the processor to perform the following operations of: storing, into a preset mapping table, mapping relations between each item of e-note in the electronic book and the content data of each item of e-note in the e-note file; the mapping table is used for mutual query of the e-note between the electronic book and the e-note file corresponding to the electronic book.

Fourth Embodiment

Figure 3:
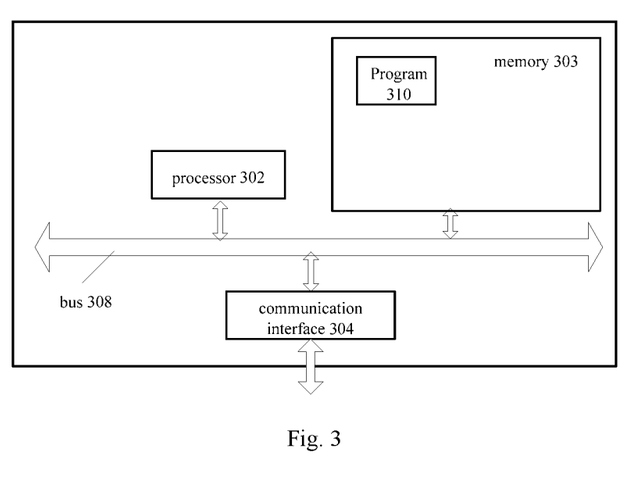
FIG. 3 shows a schematic diagram of the structure of an electronic device according to a fourth embodiment of the present disclosure.

FIG. 3 shows a schematic diagram of the structure of an electronic device according to a fourth embodiment of the present disclosure. As shown in FIG. 3, the electronic device may include: a processor 302, a communication interface 304, a memory 303 and a communication bus 308.

Wherein the processor 302, the communication interface 304, and the memory 303 communicate with each other through the communication bus 308. The communication interface 304 is configured to communicate with a network element of another device, such as a client or another server. The processor 302 is configured to execute a program 310, and may specifically perform the related steps in the embodiments of the above described application control methods. Specifically, the program 310 may include a program code, and the program code includes a computer operation instruction. The processor 302 may be a central processing unit CPU, or an application specific integrated circuit (ASIC), or one or more integrated circuits configured to implement the embodiments of the present disclosure. One or more processors included by the electronic device may be processors of the same type, such as one or more CPUs; or may be processors of different types, such as one or more CPUs and one or more ASICs. The memory 303 is configured to store the program 310. The memory 303 may include a high-speed RAM memory, and may also include a non-volatile memory, for example, at least one disk memory.

The program 310 may specifically be used to cause the processor 302 to perform the following operations of: acquiring content data of an e-note, when the e-note is generated for the electronic book; storing the content data of the e-note into an e-note file corresponding to the electronic book; determining, when an e-note management instruction is received, the electronic book corresponding to the e-note management instruction, acquiring and displaying the e-note file corresponding to the electronic book, in order to provide a management function of the e-note according to the e-note file.

In an optional embodiment, the program 310 further causes the processor 302 to perform the following operations of: providing a first type of jumping link for the electronic book; the e-note management instruction include: a first type of jumping instruction triggered by the first type of jumping link; wherein the first type of jumping link include at least one of the following:

a first type of book jumping link of a long-press or double click type provided for a cover icon of the electronic book; a first type of book jumping link provided for a cover icon of the e-note file corresponding to the electronic book displayed in a e-bookshelf; wherein in the first type of book jumping link, an identification for the electronic book is included, for jumping to the e-note file corresponding to the electronic book; a first type of page jumping link provided for each page in the electronic book; wherein in the first type of page jumping link, a page identification of a corresponding page is included, for jumping to a position of file page corresponding to the page identification, in the e-note file corresponding to the electronic book; wherein the first type of page jumping link is provided at least one of the following positions of the corresponding page in the electronic book: a header, a footer, and a page control interface; a first type of e-note jumping link provided for each e-note in the electronic book; wherein in the first type of e-note jumping link, an e-note identification of a corresponding e-note is included, for jumping to a position of content data of the e-note corresponding to the e-note identification in the e-note file corresponding to the electronic book.

In an optional embodiment, the program 310 further causes the processor 302 to perform the following operations of: providing a second type of jumping link for the e-note file; and displaying contents of the position corresponding to the second type of jumping link in the electronic book corresponding to the e-note file, when a second type of jumping instruction triggered by the second type of jumping link is received.

In an optional embodiment, the second type of jumping link comprises a second type of e-note jumping link provided for content data of each e-note stored in the e-note file; wherein in the second type of e-note jumping link, a e-note identification of a corresponding e-note is included; wherein the e-note identification of the e-note is used for determining a position corresponding to the second type of jumping link in the electronic book corresponding to the e-note file.

In an optional embodiment, the program 310 further causes the processor 302 to perform the following operations of: jumping to a position corresponding to the second type of jumping link in the electronic book corresponding to the e-note file and displaying contents at the position of the electronic book; acquiring contents of the position corresponding to the second type of jumping link in the electronic book corresponding to the e-note file, and displaying the acquired contents.

In an optional embodiment, in the electronic book, a first type of editing link is further provided, for editing each item of e-note in the electronic book, and then the program 310 further causes the processor 302 to perform the following operations of: when a first type of editing instruction sent through the first type of editing link is received, editing corresponding e-note in the electronic book according to the first type of editing instruction, and updating the content data of the corresponding e-note in the e-note file corresponding to the electronic book, according to execution result of the first type of editing instruction; in the e-note file, a second type of editing link is further provided, for editing content data of each item of e-note in the e-note file, and then the program 310 further causes the processor 302 to perform the following operations of: when a second type of editing instruction sent through the second type of editing link is received, editing the content data of corresponding e-note in the e-note file according to the second type of editing instruction, and updating the corresponding e-note in the electronic book corresponding to the e-note file, according to execution result of the second type of editing instruction.

In an optional embodiment, types of the e-note comprise at least one of the following: marks for an original text in the electronic book, and custom contents edited according to the original text in the electronic book; wherein the marks further comprises: marks of one or a plurality of mark level; the custom contents further comprises at least one of the following: custom contents of a text type, custom contents of a picture type, custom contents of an annotation type, and custom contents of a feeling type.

In an optional embodiment, the program 310 further causes the processor 302 to perform the following operations of: determining the type of the e-note, and acquiring the content data of the e-note according to an acquiring rule corresponding to the type.

In an optional embodiment, when the type of the e-note is the marked type, the acquiring rule corresponding to the type is: acquiring the marked original text in the electronic book; wherein the contents of the original text comprise at least one item of the following: all contents in the marked original text, contents of the head part in the marked original text, contents of the middle part in the marked original text, and contents of the tail part in the marked original text; when the type of the e-note is the custom contents type, the acquiring rule corresponding to the type is: acquiring the custom contents and acquiring the original text corresponding to the custom contents in the electronic book.

In an optional embodiment, the program 310 further causes the processor 302 to perform the following operations of: determining a storage position of the content data of the acquired e-note in the e-note file corresponding to the electronic book, in accordance with preset sorting rules; wherein the preset sorting rules include at least one rule of the following: a rule for sorting according to the type of the e-note, a rule for sorting according to generation time of the e-note, a rule for sorting according to the order of chapters of the e-note in the electronic book.

In an optional embodiment, when there are multiple preset sorting rules, different weights are respectively provided for each type of rules, and the storage position of the content data of the acquired e-note in the e-note file corresponding to the electronic book is determined according to the magnitude of the weights of each rule; or when there are multiple preset sorting rules, corresponding storage areas are respectively allocated for the e-note of each type, and in the storage area corresponding to the e-note of the type, a plurality of items of e-note of the type are sorted in accordance with at least one rule of the following: generation time of the e-note, and the order of chapters of the e-note in the electronic book.

In an optional embodiment, the program 310 further causes the processor 302 to perform the following operations of: adjusting the arrangement order of the content data of each piece of e-note stored in the e-note file according to preset dynamic adjustment rules; wherein the dynamic adjustment rules include at least one of the following: adjusting the arrangement order according to an access frequency of each content data, and adjusting the arrangement order according to a preset access priority for the content data.

In an optional embodiment, the program 310 further causes the processor 302 to perform the following operations of: storing, into a preset mapping table, mapping relations between each item of e-note in the electronic book and the content data of each item of e-note in the e-note file; the mapping table is used for mutual query of the e-note between the electronic book and the e-note file corresponding to the electronic book.

The algorithms and displays provided herein are not inherently related to any particular computer, virtual system or other devices. Various general-purpose systems can also be together used based on the teaching herein. According to the above description, the structure required to construct such a system is obvious. Furthermore, the present disclosure is not directed to any particular programming language. It should be understood, that the contents of the present disclosure described herein may be implemented using various programming languages, and that the description of the specific language above is to disclose the best embodiment of the present disclosure.

In the description provided herein, numerous specific details are described. It is to be understood, however, that embodiments of the present disclosure may be practiced without these specific details. In some instances, well-known methods, structures and techniques have not been shown in detail, so as not to obscure the understanding of the description. Similarly, it should be understood that, in order to simplify the present disclosure and help understanding of one or more of the various disclosed aspects, in the above description of exemplary embodiments of the present disclosure, respective features of the present disclosure are sometimes grouped together into a single embodiment, figure or description thereof. However, this disclosed method should not be construed to reflect the intention that, the present disclosure sought for protection claims more features than being expressly recited in each claim. Rather, as reflected in the following claims, the disclosed aspects are less than all features of the single embodiment disclosed previously. Thus, claims following a specific embodiment are hereby explicitly incorporated into that specific embodiment, with each claim standing on its own as a separate embodiment of the present disclosure.

Those skilled in the art can understand that, the modules in the device in an embodiment can be adaptively changed, and provided in one or more devices different from the embodiment. The modules or units or components in an embodiment may be combined into one module or unit or component, and furthermore, may be divided into a plurality of sub-modules or sub-units or sub-components. Except for at least some of such features or processes or units being mutually exclusive, all features disclosed in this specification (including the accompanying claims, abstract and drawings) and all processes or units of so disclosed any method or device may be combined in any combination. Unless expressly stated otherwise, each feature disclosed in this specification (including the accompanying claims, abstract and drawings) may be replaced by an alternative feature providing the same, equivalent or similar purpose. In addition, those skilled in the art can understand that, although some embodiments described herein include certain features included in other embodiments and not other features, combinations of features of different embodiments are meant to be within the scope of the present disclosure and form different embodiments. For example, in the following claims, any one of the claimed embodiments can be used in any combination. It should be noted that, the above-mentioned embodiments illustrate rather than limit the disclosure, and that those skilled in the art may design alternative embodiments without departing from the scope of the appended claims. In the claims, any reference sign placed between parentheses shall not be construed as limiting the claim. The word "comprising", "comprise" or "comprises" does not exclude the presence of elements or steps not listed in a claims. The word "a" or "an" preceding an element does not exclude the presence of a plurality of such elements. The present disclosure may be implemented by means of hardware including several distinct elements and by means of a suitably programmed computer. In unit claims listing several devices, several of these devices may be specifically embodied by the same hardware item. The use of the words first, second and third does not imply any order. These words can be interpreted as names.

What is claimed is:

1. A method for managing e-notes of electronic books, comprising:
    acquiring content data of an e-note when the e-note is generated for an electronic book;
    storing the content data of the e-note into an e-note file corresponding to the electronic book, wherein there are a plurality of e-note files corresponding to a plurality of electronic books each of which comprises at least one e-note, each e-note file exclusively stores content data corresponding to each e-note in a corresponding electronic book, and each e-note file is separate and independent from the corresponding electronic book;
    in response to receiving an e-note management instruction, identifying the electronic book corresponding to the e-note management instruction, acquiring and displaying the e-note file corresponding to the electronic book, and managing e-notes in the electronic book based on the e-note file corresponding to the electronic book;
    in response to receiving a first instruction of editing the e-note in the electronic book via a first interface, updating the e-note in the electronic book based on executing the first instruction, wherein the first interface displays the electronic book and at least one e-note in the electronic book, and the e-note is among the at least one e-note;
    synchronously updating the content data corresponding to the e-note in the e-note file corresponding to the electronic book based on the updated e-note in the electronic book;
    in response to receiving a second instruction of editing content data in the e-note file via a second interface, updating the content data in the e-note file based on executing the second instruction, wherein the second interface is an interface for browsing the e-note file and displaying the content data in the e-note file;
    synchronously updating a corresponding e-note in the electronic book corresponding to the e-note file based on the updated content data in the e-note file;
    providing jumping links configured to jump between the electronic book and the e-note file corresponding to the electronic book, wherein the jumping links comprise a first type of jumping link associated with the electronic book and a second type of jumping link associated with the e-note file, the first type of jumping link is configured to trigger a first type of jumping instruction, and the second type of jumping link is configured to trigger a second type of jumping instruction;
    jumping from the electronic book to a corresponding position of the e-note file and displaying at least one part of the e-note file in response to the first type of jumping instruction triggered by the first type of jumping link; and
    jumping from the e-note file to a corresponding position of the electronic book and displaying at least one part of the electronic book in response to the second type of jumping instruction triggered by the second type of jumping link.

2. The method according to claim 1, wherein the first type of jumping link includes at least one of:
    a first type of book jumping link of a long-press or double click type provided for a cover icon of the electronic book, or a first type of book jumping link provided for a cover icon of the e-note file corresponding to the electronic book displayed in an e-bookshelf, wherein the first type of book jumping link includes an identification for the electronic book configured to jump to the e-note file corresponding to the electronic book;
    a first type of page jumping link provided for each page in the electronic book, wherein the first type of page jumping link includes a page identification of a corresponding page configured to jump to a position of file page corresponding to the page identification in the e-note file corresponding to the electronic book, wherein the first type of page jumping link is provided at least one of the following positions of the corresponding page in the electronic book: a header, a footer, and a page control interface; or
    a first type of e-note jumping link provided for each e-note in the electronic book, wherein the first type of e-note jumping link includes an e-note identification of a corresponding e-note configured to jump to a position of content data of the e-note corresponding to the e-note identification in the e-note file corresponding to the electronic book.

3. The method according to claim 1,
    wherein the second type of jumping link comprises a second type of e-note jumping link provided for content data of each e-note stored in the e-note file, the second type of e-note jumping link includes an e-note identification of a corresponding e-note, the e-note identification of the corresponding e-note is configured to determine the position in the electronic book corresponding to the second type of jumping link; and wherein the displaying content at a position in the electronic book corresponding to the second type of jumping link further comprises at least one of:

jumping to the position in the electronic book and displaying the content at the position in the electronic book, or acquiring the content at the position in the electronic book and displaying the acquired content at the position in the electronic book.

4. The method according to claim 1, wherein there are a plurality of types of e-notes, the plurality of types of e-notes comprise at least one of:

marks of an original text in the electronic book, or custom content added based on the original text in the electronic book;

wherein the marks further comprise one or more levels of marks, the custom content further comprises at least one of: a text type of custom content, a picture type of custom content, an annotation type of custom content, or a feeling type of custom content.

5. The method according to claim 4, wherein the acquiring content data of an e-note further comprises:

determining a type of the e-note;

acquiring the content data of the e-note according to a rule corresponding to the type;

when the e-note is a mark of an original text in the electronic book, the corresponding rule comprises acquiring content of the original text in the electronic book, wherein the content of the original text comprises at least one of: all content in the marked original text, content of the head part in the marked original text, content of the middle part in the marked original text, or content of the tail part in the marked original text; and when the e-note is custom content, the corresponding rule comprises acquiring the custom content and the original text in the electronic book associated with the custom content.

6. The method according to claim 1, wherein the storing the content data of the e-note into an e-note file corresponding to the electronic book further comprises:

determining a storage position of storing the content data of the e-note in the e-note file corresponding to the electronic book based on a predetermined rule of ranking the e-note, wherein the predetermined rule include at least one of:

ranking the e-note based on a type of the e-note, ranking the e-note based on a generation time of the e-note, ranking the e-note based on an order of chapter where the e-note is located in the electronic book.

7. The method according to any of claim 6, wherein the predetermined rule comprises a plurality of rules, the method further comprises:

assigning different weights to the plurality of rules, and determining the storage position of storing the content data of the e-note in the e-note file corresponding to the electronic book based at least on the different weights of the plurality of rules; or allocating a corresponding storage area to each type of e-notes, and in the corresponding storage area of each type of e-notes, ranking a plurality of e-notes in a same type based on at least one of a generation time of each of the plurality of e-notes or an order of chapters where each of the plurality of e-notes is located in the electronic book.

8. The method according to claim 1, wherein the method further comprises:

adjusting an arrangement order of the content data corresponding to each e-note stored in a corresponding e-note file based on predetermined dynamic adjustment rules, wherein the predetermined dynamic adjustment rules include at least one of:

adjusting the arrangement order based on a frequency of accessing the content data corresponding to each e-note, or adjusting the arrangement order based on a predetermined priority of accessing the content data corresponding to each e-note.

9. The method according to claim 1, wherein the method further comprises:

storing, into a predetermined mapping table, relationships between each e-note in the electronic book and corresponding content data in the e-note file corresponding to the electronic book;

wherein the mapping table is configured to mutually query between the electronic book and the e-note file corresponding to the electronic book.

10. An electronic device, comprising:

at least one processor; and at least one memory, the at least one memory storing executable instructions that upon execution cause the at least one processor to perform operations, the operations comprising:

acquiring content data of an e-note when the e-note is generated for an electronic book wherein the e-note is one of a plurality of e-notes in the electronic book;

storing the content data of the e-note into an e-note file corresponding to the electronic book, wherein there are a plurality of e-note files corresponding to a plurality of electronic books each of which comprises at least one e-notes, each e-note file exclusively comprises content data corresponding to each e-note in a corresponding electronic book, and each e-note file is separate and independent from the corresponding electronic book;

in response to receiving an e-note management instruction, identifying the electronic book corresponding to the e-note management instruction;

acquiring and displaying the e-note file corresponding to the electronic book;

managing the plurality of e-notes in the electronic book based on the e-note file corresponding to the electronic book;

in response to receiving a first instruction of editing the e-note in the electronic book via a first interface, updating the e-note in the electronic book based on executing the first instruction, wherein the first interface displays the electronic book and at least one e-note in the electronic book, and the e-note is among the at least one e-note;

synchronously updating the content data corresponding to the e-note and stored in the e-note file corresponding to the electronic book based on the updated e-note in the electronic book;

in response to receiving a second instruction of editing content data in the e-note file via a second interface, updating the content data in the e-note file based on executing the second instruction, wherein the second interface is an interface for browsing the e-note file and displaying the content data in the e-note file;

synchronously updating a corresponding e-note in the electronic book corresponding to the e-note file based on the updated content data in the e-note file;

providing jumping links configured to jump between the electronic book and the e-note file corresponding to the electronic book, wherein the jumping links comprise a first type of jumping link associated with the electronic book and the second type of jumping link associated with the e-note file, the first type of jumping link is configured to trigger a first type of jumping instruction, and the second type of jumping link is configured to trigger a second type of jumping instruction;

jumping from the electronic book to a corresponding position of the e-note file and displaying at least one part of the e-note file in response to the first type of jumping instruction triggered by the first type of jumping link; and jumping from the e-note file to a corresponding position of the electronic book and displaying at least one part of the electronic book in response to the second type of jumping instruction triggered by the second type of jumping link.

11. The electronic device according to claim 10, wherein the first type of jumping link includes at least one of:

a first type of book jumping link of a long-press or double click type provided for a cover icon of the electronic book, or a first type of book jumping link provided for a cover icon of the e-note file corresponding to the electronic book displayed in an e-bookshelf, wherein the first type of book jumping link includes an identification of the electronic book configured to jump to the e-note file corresponding to the electronic book;

a first type of page jumping link provided for each page in the electronic book wherein the first type of page jumping link includes a page identification of a corresponding page configured to jump to a position of file page corresponding to the page identification, in the e-note file corresponding to the electronic book, wherein the first type of page jumping link is provided at least one of the following positions of the corresponding page in the electronic book: a header, a footer, and a page control interface; or a first type of e-note jumping link provided for each e-note in the electronic book, wherein the first type of e-note jumping link includes an e-note identification of a corresponding e-note configured to jump to a position of content data of the e-note corresponding to the e-note identification in the e-note file corresponding to the electronic book.

12. The electronic device according to claim 10, wherein the second type of jumping link comprises a second type of e-note jumping link provided for content data of each e-note stored in the e-note file, the second type of e-note jumping link includes an e-note identification of a corresponding e-note, the e-note identification of the corresponding e-note is configured to determine the position in the electronic book corresponding to the second type of jumping link; and wherein the displaying content at a position in the electronic book corresponding to the second type of jumping link further comprises at least one of:

jumping to the position in the electronic book and displaying the content at the position in the electronic book, or acquiring the content at the position in the electronic book and displaying the acquired content at the position in the electronic book.

13. The electronic device according to claim 10, wherein there are a plurality of types of e-notes, the plurality of types of e-notes comprise at least one of: marks of an original text in the electronic book, or custom content added based on the original text in the electronic book;

wherein the marks further comprise one or more levels of marks, the custom content further comprises at least one of: a text type of custom content, a picture type of custom content, an annotation type of custom content, or a feeling type of custom content.

14. The electronic device according to claim 13, the operations further comprising:

determining a type of the e-note;

acquiring the content data of the e-note according to a rule corresponding to the type;

when the e-note is a mark of an original text in the electronic book, the corresponding rule comprises acquiring content of the original text in the electronic book, wherein the content of the original text comprises at least one of: all content in the marked original text, content of the head part in the marked original text, content of the middle part in the marked original text, or content of the tail part in the marked original text; and when the e-note is custom content, the corresponding rule comprises acquiring the custom content and the original text in the electronic book associated with the custom content.

15. The electronic device according to claim 10, the operations further comprising:

determining a storage position of storing the content data of the e-note in the e-note file corresponding to the electronic book based on a predetermined rule of ranking the e-note; wherein the predetermined rule includes at least one of:

ranking the e-note based on a type of the e-note, ranking the e-note based on a generation time of the e-note, ranking the e-note based on an order of a chapter where the e-note is located in the electronic book.

16. The electronic device according to claim 15, wherein the predetermined rule comprises a plurality of rules, the operations further comprising:

assigning different weights to the plurality of rules, and determining the storage position of storing the content data of the e-note in the e-note file corresponding to the electronic book based at least on the different weights of the plurality of rules; or allocating a corresponding storage area to each type of e-notes, and in the corresponding storage area of each type of e-notes, ranking a plurality of e-notes in a same type based on at least one of a generation time of each of the plurality of e-notes or an order of chapters where each of the plurality of e-notes is located in the electronic book.

17. The electronic device according to claim 10, the operations further comprising:

adjusting an arrangement order of the content data corresponding to each e-note stored in a corresponding e-note file based on predetermined dynamic adjustment rules, wherein the predetermined dynamic adjustment rules include at least one of:

adjusting the arrangement order based on a frequency of accessing the content data corresponding to each e-note, or adjusting the arrangement order based on a predetermined priority of accessing the content data corresponding to each e-note.

18. The electronic device according to claim 10, the operations further comprising:

storing, into a predetermined mapping table, relationships between each e-note in the electronic book and corresponding content data in the e-note file corresponding to the electronic book;

wherein the mapping table is configured to mutually query between the electronic book and the e-note file corresponding to the electronic book.

19. A non-transitory computer-readable storage medium storing computer-readable instructions that upon execution by a processor cause the processor to:

acquire content data of an e-note when the e-note is generated for an electronic book, wherein the e-note is one of a plurality of e-notes in the electronic book;

store the content data of the e-note into an e-note file corresponding to the electronic book, wherein there are a plurality of e-note files corresponding to a plurality of electronic books each of which comprises e-notes, each e-note file exclusively comprises content data corresponding to each e-note in a corresponding electronic book, and each e-note file is separate and independent from the corresponding electronic book;

in response to receiving an e-note management instruction, identify the electronic book corresponding to the e-note management instruction;

acquire and display the e-note file corresponding to the electronic book; and manage the plurality of e-notes in the electronic book based on the e-note file;

in response to receiving a first instruction of editing the e-note in the electronic book via a first interface, update the e-note in the electronic book based on executing the first instruction, wherein the first interface displays the electronic book and at least one e-note in the electronic book, and the e-note is among the at least one e-note;

synchronously update the content data corresponding to the e-note in the e-note file corresponding to the electronic book based on the updated e-note in the electronic book;

in response to receiving a second instruction of editing content data in the e-note file via a second interface, update the content data in the e-note file based on executing the second instruction, wherein the second interface is an interface for browsing the e-note file and displaying the content data in the e-note file;

synchronously update a corresponding e-note in the electronic book corresponding to the e-note file based on the updated content data in the e-note file;

provide jumping links configured to jump between the electronic book and the e-note file corresponding to the electronic book, wherein the jumping links comprise a first type of jumping link associated with the electronic book and the second type of jumping link associated with the e-note file, the first type of jumping link is configured to trigger a first type of jumping instruction, and the second type of jumping link is configured to trigger a second type of jumping instruction;

jump from the electronic book to a corresponding position of the e-note file and display at least one part of the e-note file in response to the first type of jumping instruction triggered by the first type of jumping link; and jump from the e-note file to a corresponding position of the electronic book and display at least one part of the electronic book in response to the second type of jumping instruction triggered by the second type of jumping link.

\* \* \* \* \*